United States Patent [19]

Starnes, Jr. et al.

[11] Patent Number: 4,519,131
[45] Date of Patent: May 28, 1985

[54] METHOD AND APPARATUS FOR STRIPPING MULTIPLEX WIRE AND CABLE

[75] Inventors: Ralph E. Starnes, Jr.; Danny P. Carden, both of Carroll County, Ga.

[73] Assignee: Southwire Company, Carrollton, Ga.

[21] Appl. No.: 510,047

[22] Filed: Jul. 1, 1983

[51] Int. Cl.³ .............................................. H01R 43/00
[52] U.S. Cl. ........................................ 29/825; 81/9.51
[58] Field of Search ............... 81/9.51, 9.5 R; 83/924; 29/825; 57/2.5, 3

[56] References Cited

U.S. PATENT DOCUMENTS

| | | | |
|---|---|---|---|
| 2,055,948 | 9/1936 | Selquist | 174/129 R |
| 2,844,056 | 7/1958 | Sladek | 81/9.51 |
| 2,882,188 | 4/1959 | Levin et al. | 81/9.51 X |
| 3,309,947 | 3/1967 | Denney | |
| 3,724,189 | 4/1973 | Bishop et al. | |
| 3,853,156 | 12/1974 | Folkenroth et al. | 81/9.51 X |
| 3,858,776 | 1/1975 | Blackstone et al. | |
| 3,975,208 | 8/1976 | Tate et al. | |
| 3,977,277 | 8/1976 | Baston et al. | |
| 3,988,666 | 10/1976 | Rowland et al. | |
| 4,083,096 | 4/1978 | Baston et al. | |
| 4,199,854 | 4/1980 | Bitting et al. | 81/9.51 X |

Primary Examiner—Mark Rosenbaum
Assistant Examiner—Carl J. Arbes
Attorney, Agent, or Firm—Herbert M. Hanegan

[57] ABSTRACT

Apparatus for and method of removing insulation from strands of multiplex cable in a single operation by unplexing multiplex cable, removing insulation and replexing bare multiplex cable in a single operation, and the uninsulated product thereof.

7 Claims, 3 Drawing Figures

METHOD AND APPARATUS FOR STRIPPING MULTIPLEX WIRE AND CABLE

TECHNICAL FIELD

This invention relates generally to recovering insulation and conductor from insulated wire and cable, and more particularly to a method of and an apparatus for simultaneously stripping insulation and other coverings from each strand of a multiplex cable, and the uninsulated product thereof.

BACKGROUND ART

The removal of a covering from a core strand is well known in the art. Examples are found in U.S. Pat. Nos. 3,309,947; 3,724,189; 3,858,776; 3,936,922; 3,975,208; 3,977,277 and 4,083,096. All these systems however, are able to remove a jacket from only a single strand. Since multiplex cable and multiplex wire is made up of at least three strands, at least two of which are jacketed, it is required that each strand be separated from the multiplex cable before being processed by one of the methods described in the above reference patents. An alternate method of recovering the conductor is to chop the entire cable into small pieces which may be separated by sifting means. This method is generally inefficient on larger sizes of cable which includes most of what is referred to as multiplex cable.

U.S. Pat. No. 3,988,666 and U.S. patent application Ser. No. 362,726 filed 03/29/82 also relate to the present inventon because both of these processes act on individual strands of multiplex cable.

DISCLOSURE OF INVENTION

It is therefore a primary object of this invention to provide a method of and an apparatus for removing insulation and other jacket material from strands of multiplex cable.

Another object of this invention is to provide a method of and an apparatus for unplexing strands of multiplex cable, stripping the outer covering from multiplex cable and replexing the conductors of the multiplex cable in a single operation.

Still another object of this invention is to provide a product of this method and apparatus which is a length of multiplex cable wherein each insulated or jacketed strand has had the insulaton or other jacket material removed.

BRIEF DESCRIPTION OF THE DRAWINGS

While the specification concludes with claims particularily pointing out and distinctly claiming the subject matter which is regarded as the invention, it is believed that the invention objects, features and advantages thereof will be better understood from the following description taken in connection with the accompanied drawings in which like parts are given like identification numerals and wherein:

BEST MODE FOR CARRYING OUT THE INVENTION

Figure 1:
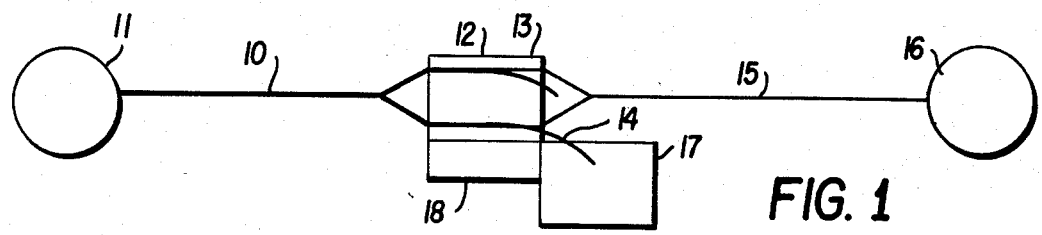
FIG. 1 is a schematic elevation of the preferred embodiment.

Referring now to FIG. 1, insulated multiplex cable 10 is mounted on a payoff means 11 and is guided to a multiplex strand stripper means 12. The multiplex strand stripper means 12 comprises a rotatable frame 13 which separates each strand of a multiplex cable 10, guides each strand of the multiplex cable 10 along a straight rotatable path and replexes each strand of the multiplex cable 10 in a continuous method. As each strand advances along the straight rotatable path, stripper means 12 continuously removes the insulation or jacket material 14 from the conductor 15. As the bare strands 15 replex into an uninsulated multiplex cable 15, this uninsulated multiplex cable product advances to takeup means 16 resulting in a spool of uninsulated multiplex cable. Meanwhile, the lengths of insulation or jacket material 14 being stripped from the conductor 15 also advance out of the rotatable multiplex cable stripper 12 toward a collection means 17 which receives the jacket material as it is cut into short pieces. As used herein the term "insulation" refers to all jacketing material including strand shielding and semiconductor layers. Thus, in a continuous process, multiplex cable 10 is removed from a single payoff spool 11, is unplexed, is stripped of all nonconductor materials 14, is replexed and is wound onto a single takeup spool 16. The resulting product is a very high purity metal product which can be used for charging into the furnace of a continuous casting system without additional purification or refinement. This also results in substantially all of the metal being reclaimed instead of being scrapped along with the insulation, which occurs in the conventional chopping and sifting method.

Figure 2:
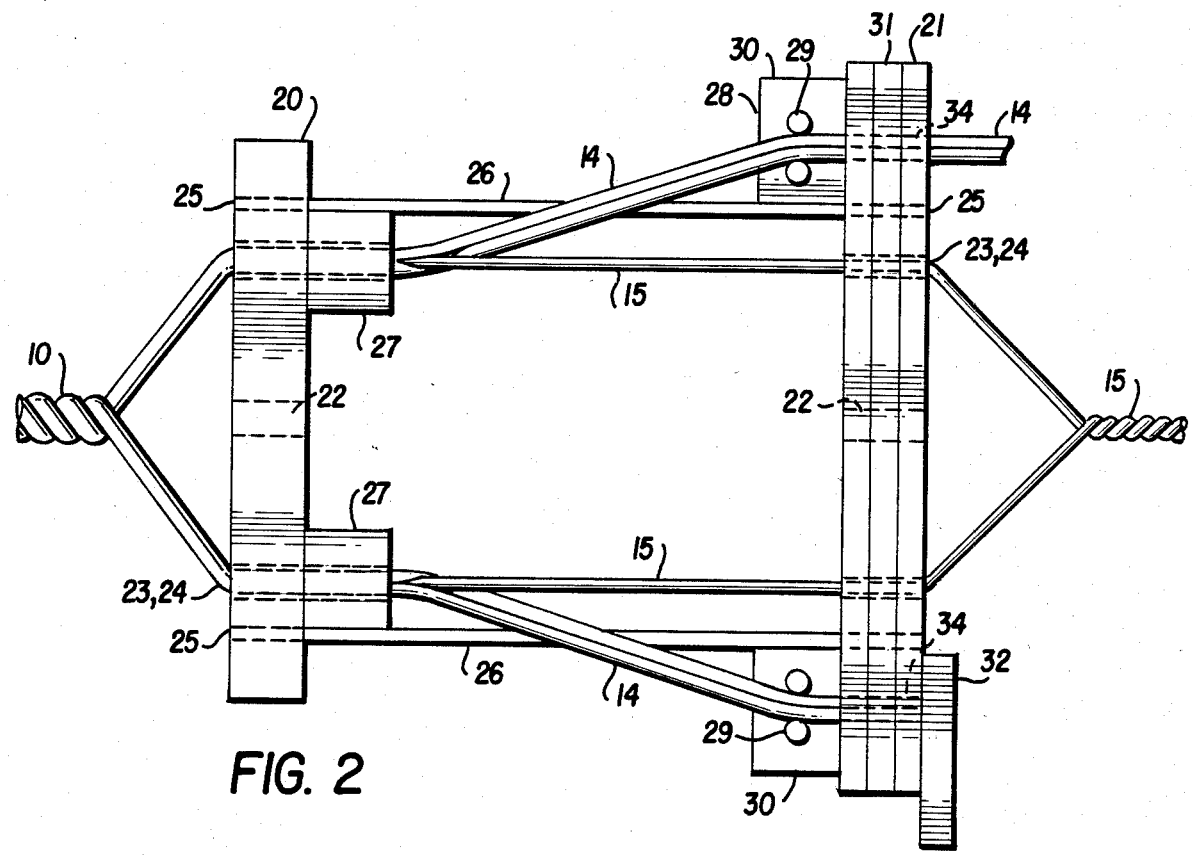
FIG. 2 is an elevation of the stripper means of the preferred embodiment.

Referring now to FIG. 2 which shows the rotating multiplex cable stripping apparatus 12 in more detail, it can be seen that the stripper apparatus 12 comprises two discs 20 and 21 rotatable in unison about the longitudinal axis of the multiplex cable 10 by rotation means 18. Three or more discs may also be used. Each disc is concentric with the longitudinal axis of the multiplex cable 10, and in each disc there are numerous apertures, one in the center 22, six 23 symmetrically spaced intermediate about the central aperture 22, and three 25 close to the outer edge of the disc at about 120 angular degrees from each other. An alternate mode will have four instead of six apertures symmetrically spaced around the central aperture. Two or more such symmetrically spaced intermediate apertures 23 and two or more outer apertures 25 are anticipated. A polished guide ring 24 is mounted in each of the six apertures 23 in the entrance disc 20 and also in each of the six apertures 23 of the exit disc 21 to reduce friction between the apertures and the multiplex cable 10. Mounting bolts 26, passed through the three outer interconnection apertures 25 of both discs 20 and 21 which spaced the discs apart and align the remaining apertures so that straight lines perpendicular to the generally flat surface of the discs and passing through any of the apertures will also pass through the corresponding apertures in the other disc. Thus, several straight cable paths parallel to longitudinal axis of the multiplex cable 10 are formed through discs 20 and 21.

An insulation stripper 27 is mounted at each intermediate aperture 23 of the entrance disc 20. The insulated strand passing through the intermediate aperture 23 is stripped of insulation 14 in one or more continuous lengths. The lengths of insulation 14 feed into pulling means 28 comprising pinch rollers 29 driven by motor 30. An electrical contact slide ring 31 transmits power to motor 30. Motor 30 drives rollers 29 at a rate equal to the line speed of the system to pull the lengths of insulation 14 with appropriate tension. The lengths 14 are then forced into guide 34 which directs the insulation to a blade 32. Blade 32 is stationary and cuts the insulation 14 as it exits guide 34 and rotates against blade 32. The insulation 14 is then directed to collection means 17. Since the length of the insulation 14 presented to the blade 32 is dependent upon the lay length of the cable 10, two or more blades 32 may be spaced around the path of rotation of the insulation guides 34 in order to provide manageable lengths of insulation.

Figure 3:
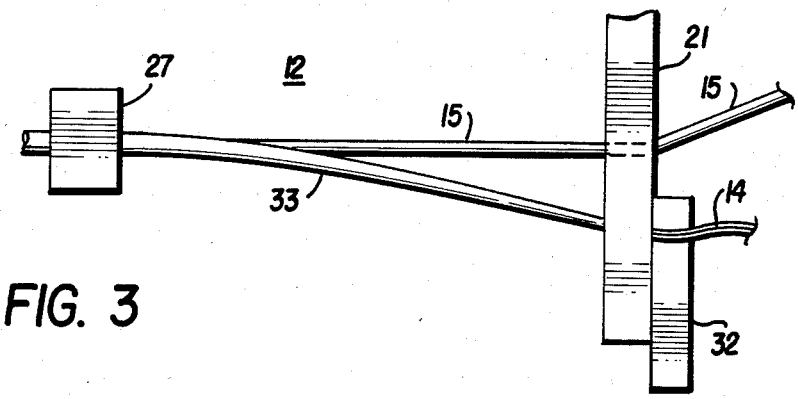
FIG. 3 is an elevation of an alternate stripper means of the preferred embodiment.

FIG. 3 illustrates an alternate stripper apparatus 12 wherein the lengths of insulation 14 are guided toward blade 32 without the use of pulling means 28. Instead, the insulation 14 is simply directed by the force of the advancing cable 10 to guide tube 33 which assures removal of the insulation lengths 14 from the conductor 15 and guides them to blade 32 for cutting.

Multiplex cable having two or more strands can be stripped by this apparatus. If all of the strands of seven strand multiplex cable 10 are insulated and require removal of insulation, they must all be stripped. In this case, all of the passageways will be utilized and the apparatus will rotate in a balanced manner. If multiplex cable having less than seven strand is to be processed by this apparatus, the operator simply uses the opposing paths to eliminate any substantial imbalance.

As the bare conductor 15 exits disc 21 the rotation of discs in unison and the pull exerted by takeup spool 16 cause the strands to change from the straight paths to paths which wind them together. The stripped multiplex cable 15 is then pulled onto the takeup spool 16 for further processing.

This embodiment is, of course, merely exemplary of the possible changes and variations. Because many varying and different embodiments may be made within the scope of the invented concept disclosed herein, and because many modifications may be made in the embodiment herein detailed in accordance with the descriptive requirements of the law, it should be generally understood that the details herein are to be interpreted as illustrated and not in a limiting sense.

INDUSTRIAL APPLICABILITY

This invention is capable of exploitation in the wire and cable reclamation industry and is particularly useful in a system for reclaiming conductor material and insulation or jacket material from multiplex cable.

What is claimed is:

1. The method of continuously removing insulation from conductors of multiplex cable, comprising the steps of:
   supplying lengths of insulated multiplex cable;
   advancing each insulated strand of the multiplex cable along a straight path parallel to a predetermined longitudinal axis;
   continuously removing insulation from said insulated strands in one or more lengths while in said straight path;
   directing said insulation away from said longitudinal axis;
   plexing each conductor around said longitudinal axis; and
   collecting bare multiplex cable on storage means.

2. The method of claim 1, further comprising the steps of cutting and removing said insulation after it has been directed away from said longitudinal axis.

3. Apparatus for continuously removing insulation from conductors of multiplex cable, comprising:
   a frame rotatable about the longitudinal axis of the multiplex cable path, said frame adapted to be placed in the multiplex cable path;
   an entrance disc secured to said frame such that it rotates concentrically about said longitudinal axis, said entrance disc having a plurality of symmetrically spaced cable entrance guide means;
   stripper means secured to said entrance disc adjacent to each of said cable entrance guide means;
   an exit disc secured to said frame in spaced relation from said entrance disc, said entrance disc being concentrically rotatable about said longitudinal axis and having a plurality of symmetrically spaced cable exit guide means;
   insulation guide means secured to said exit disc means for directing lengths of stripped insulation away from said longitudinal axis;
   cutting means stationed adjacent to said insulation guide means for removing said lengths of insulation from said apparatus; and
   means connected to said frame for rotating said frame about the longitudinal axis of the multiplex cable path.

4. The apparatus of claim 3 further comprising means operatively associated with said entrance disc for supplying a length of multiplex cable to said entrance disc and means operatively associated with said exit disc for collecting a length of bare multiplex cable from said exit disc.

5. The apparatus of claim 3, wherein said insulation guide means comprise means for pulling said insulation lengths toward said cutting means.

6. The apparatus of claim 3, wherein said entrance disc further comprises:
   a disc having a single central passageway;
   two or more cable guide passageways symmetrically spaced around said single central passageway;
   friction reducing cable guide means mounted in each cable guide passageway; and
   insulation stripper means mounted adjacent to said each of said cable guide passageways.

7. The apparatus of claim 3, wherein said exit disc further comprises:
   a disc having a single central passageway;
   two or more cable guide passageways symmetrically spaced around said single central passageway;
   two or more outer insulation guide passageways terminating at a plane adjacent to said cutting means; and
   friction reducing cable guide means mounted in each cable guide passageway.

* * * * *